United States Patent
Zhang et al.

(10) Patent No.: US 9,071,507 B2
(45) Date of Patent: Jun. 30, 2015

(54) SYSTEM AND METHOD FOR REGISTERING A CIM PROVIDER IN A CIM SYSTEM USING INFORMATION OF A DEVICE TO BE CONFIGURED

(75) Inventors: Chao Zhang, Hangzhou (CN); Yong Chao, Hangzhou (CN); Xiaofeng Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 485 days.

(21) Appl. No.: 13/565,657

(22) Filed: Aug. 2, 2012

(65) Prior Publication Data

US 2013/0054764 A1  Feb. 28, 2013

Related U.S. Application Data

(63) Continuation of application No. PCT/CN2011/078696, filed on Aug. 22, 2011.

(51) Int. Cl.
*G06F 15/177* (2006.01)
*H04L 12/24* (2006.01)

(52) U.S. Cl.
CPC .......... *H04L 41/0213* (2013.01); *H04L 41/12* (2013.01); *H04L 41/0233* (2013.01)

(58) Field of Classification Search
CPC .. H04L 41/0233; H04L 41/12; H04L 41/0213
USPC .................. 709/202–203, 220–222, 223–226
See application file for complete search history.

(56) References Cited

U.S. PATENT DOCUMENTS 7,966,394 B1 *  6/2011  Talwar et al. .................. 709/220
8,214,472 B2 *  7/2012  Yang et al. .................... 709/222
2004/0128375 A1 *  7/2004  Rockwell ....................... 709/220
2007/0073877 A1  3/2007  Boykin et al.
2008/0040376 A1 *  2/2008  Reeves et al. ................. 707/102
2008/0126551 A1  5/2008  Conner et al.
2009/0292801 A1  11/2009  Yang et al.
2010/0058339 A1 *  3/2010  Beilmann et al. ............. 709/203

FOREIGN PATENT DOCUMENTS

CN         1921413 A       2/2007
CN      100527684 C        8/2009
CN      101594376 A       12/2009

OTHER PUBLICATIONS

International Search Report and Translation received in Patent Cooperation Treaty Application No. PCT/CN2011/078696, mailed May 31, 2012, 7 pages.
Written Opinion of the International Searching Authority received in Patent Cooperation Treaty Application No. PCT/CN2011/078696, mailed May 31, 2012, 5 pages.
Chinese Search Report received in Application No. 2011800015251 mailed Feb. 6, 2013, 2 pages.

* cited by examiner

*Primary Examiner* — Bharat N Barot
(74) *Attorney, Agent, or Firm* — Slater & Matsil, L.L.P.

(57) ABSTRACT

A registration method includes acquiring, by a second CIMOM, parameters of a CIM provider from a first CIMOM by using information of a namespace to which a device to be configured belongs or device information of the device to be configured. The second CIMOM obtains identification information of the CIM provider in the parameters of the CIM provider through matching according to the device information or model information of the device to be configured. The second CIMOM acquires the CIM provider from the first CIMOM by using the obtained identification information of the CIM provider, and registering the CIM provider.

20 Claims, 4 Drawing Sheets

SYSTEM AND METHOD FOR REGISTERING A CIM PROVIDER IN A CIM SYSTEM USING INFORMATION OF A DEVICE TO BE CONFIGURED

CROSS-REFERENCE TO RELATED APPLICATIONS

This application is a continuation of co-pending International Application No. PCT/CN2011/078696, filed Aug. 22, 2011, which is incorporated herein by reference.

TECHNICAL FIELD

Embodiments of the present invention relate to system management and maintenance technologies, and in particular, to a registration method of a CIM provider (Provider) in a Common Information Model (CIM) system, and a CIM object manager (CIMOM).

BACKGROUND

The CIM is a standard model that is proposed by the Distributed Management Task Force (DMTF) and is applied to device and system resource management, and has now successfully applied to management of various system devices such as servers and terminal devices. In a management mode based on CIM, device information and/or Operating System (OS) resource information corresponding to a device is modeled first by using a CIM standard, and a corresponding CIM provider is generated according to a specific management policy, and then the CIM provider is registered with a CIMOM, thereby it may be implemented that a CIM client (Client) performs a management operation on the device by calling the corresponding CIM provider through the CIMOM.

However, in the prior art, the CIM provider needs to be manually registered with the CIMOM, the operation is complex and error-prone, causing a decrease of the efficiency and reliability of the registration of the CIM provider.

SUMMARY OF THE INVENTION

Embodiments of the present invention provide a registration method of a CIM provider in a CIM system and a CIMOM, which are used to improve the efficiency and reliability of the registration of the CIM provider.

An aspect of the present invention provides a registration method of a CIM provider in a CIM system, where the CIM system includes a first CIMOM and a second CIMOM. At least one CIM provider is registered on the first CIMOM. In this embodiment, the second CIMOM acquires parameters of a CIM provider from the first CIMOM by using information of a namespace to which a device to be configured belongs or device information of the device to be configured. The acquired parameters of the CIM provider are sent by the first CIMOM according to the information of the namespace or the device information. The second CIMOM obtains identification information of the CIM provider in the parameters of the CIM provider through matching according to the device information or model information of the device to be configured. The second CIMOM acquires the CIM provider from the first CIMOM by using the obtained identification information of the CIM provider and registers the CIM provider.

Another aspect of the present invention provides a registration method of a CIM provider in a CIM system. The CIM system includes a first CIMOM and a second CIMOM, and at least one CIM provider is registered on the first CIMOM. In this embodiment, the first CIMOM sends parameters of a CIM provider to the second CIMOM according to received information of a namespace to which a device to be configured belongs or device information of the device to be configured sent by the second CIMOM, so that the second CIMOM obtains identification information of the CIM provider in the parameters of the CIM provider through matching according to the device information or model information of the device to be configured. The first CIMOM sends the CIM provider to the second CIMOM according to the received identification information of the CIM provider sent by the second CIMOM, so that the second CIMOM registers the CIM provider.

Another aspect of the present invention provides a CIMOM. An acquisition unit is configured to acquire parameters of a CIM provider from another CIMOM by using information of a namespace to which a device to be configured belongs or device information of the device to be configured. The acquired parameters of the CIM provider are sent by the another CIMOM according to the information of the namespace or the device information, and at least one CIM provider is registered on the another CIMOM. A matching unit is configured to obtain, through matching, identification information of the CIM provider in the parameters of the CIM provider that are acquired by the acquisition unit according to the device information or model information of the device to be configured. A registration unit is configured to acquire the CIM provider from the another CIMOM by using the identification information of the CIM provider obtained by the matching unit through matching, and to register the CIM provider.

Another aspect of the present invention provides a CIMOM. A first sending unit is configured to send parameters of a CIM provider to another CIMOM according to received information of a namespace to which a device to be configured belongs or device information of the device to be configured sent by the another CIMOM, so that the another CIMOM obtains identification information of the CIM provider in the parameters of the CIM provider through matching according to the device information or model information of the device to be configured. A second sending unit is configured to send the CIM provider to the another CIMOM according to the received identification information of the CIM provider sent by the another CIMOM, so that the another CIMOM registers the CIM provider.

It can be seen from above technical solutions that, through the embodiments of the present invention, the problem of complex operation and proneness to err caused by manual registration of the CIM provider with the CIMOM in the prior art can be avoided, thereby improving the efficiency and reliability of the registration of the CIM provider.

BRIEF DESCRIPTION OF THE DRAWINGS

To illustrate the technical solutions in the embodiments of the present invention or in the prior art more clearly, the accompanying drawings for describing the embodiments or the prior art are introduced briefly in the following. Apparently, the accompanying drawings in the following description are some embodiments of the present invention, and persons of ordinary skill in the art may further derive other drawings according to these accompanying drawings without creative efforts.

DETAILED DESCRIPTION OF ILLUSTRATIVE EMBODIMENTS

In order to make the objectives, technical solutions, and advantages of the present invention more comprehensible, the technical solutions in the embodiments of the present invention are clearly and completely described in the following with reference to the accompanying drawings. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
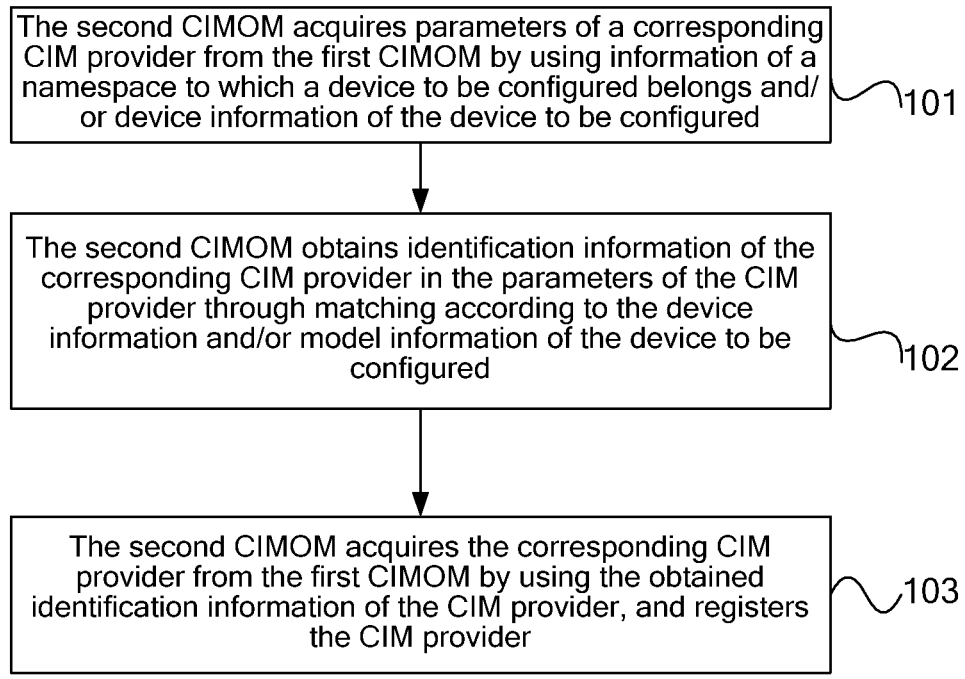
FIG. 1 is a schematic flow chart of a registration method of a CIM provider in a CIM system according to an embodiment of the present invention.

FIG. 1 is a schematic flow chart of a registration method of a CIM provider in a CIM system according to an embodiment of the present invention. A CIM system applicable to the embodiment may include a first CIMOM and a second CIMOM, where at least one CIM provider is registered on the first CIMOM. As shown in FIG. 1, the registration method of a CIM provider in a CIM system according to the embodiment may include the following.

101. The second CIMOM acquires parameters of a corresponding CIM provider from the first CIMOM by using information of a namespace to which a device to be configured belongs and/or device information of the device to be configured (this is, using the information of the namespace or the device information, or the information of the namespace and the device information), where the acquired parameters of the CIM provider are sent by the first CIMOM according to the information of the namespace and/or the device information.

Before 101, the second CIMOM may further detect the first CIMOM that is capable of providing services through broadcast. For example, the second CIMOM broadcasts a detection message by using the Service Location Protocol (SLP), and after receiving the detection message, the first CIMOM returns a response message to the second CIMOM, which is used to determine itself as the first CIMOM.

Accordingly, in 101, the second CIMOM may acquires parameters of a corresponding CIM provider from the first CIMOM that is detected through broadcast by using the information of the namespace to which the device to be configured belongs and/or the device information of the device to be configured.

Optionally, the second CIMOM may further acquire parameters of a corresponding CIM provider from a pre-designated first CIMOM by using the information of the namespace to which the device to be configured belongs and/or the device information of the device to be configured.

Optionally, before 101, the second CIMOM may further acquire information of a corresponding namespace from the first CIMOM, and then obtains the information of the namespace to which the device to be configured belongs through matching.

102. The second CIMOM obtains identification information of the corresponding CIM provider in the parameters of the CIM provider through matching according to the device information and/or model information of the device to be configured (that is, according to the device information or the model information, or according to the device information and the model information at the same time).

The model information may be acquired through its own type definition file.

If the obtained CIM provider is stored in a CIM repository (Repository) of the second CIMOM (that is, the second CIMOM has registered the obtained CIM provider), in step 102, the second CIMOM may obtain identification information of a corresponding CIM provider of a higher version than that of the CIM provider stored in the CIM repository in the parameters of the CIM provider through matching according to the device information and/or the model information of the device to be configured.

103. The second CIMOM acquires the corresponding CIM provider from the first CIMOM by using the obtained identification information of the CIM provider, and registers the CIM provider.

In 103, the second CIMOM may specifically acquire the corresponding CIM provider and permission information from the first CIMOM by using the obtained identification information of the CIM provider, where the permission information is capable of indicating whether the acquired CIM provider can be provided for other second CIMOMs, so that the forwarding permission of the CIM provider may further be effectively controlled while it is ensured that the CIM provider is correctly deployed (that is, registered).

Optionally, in 101, if the second CIMOM has not acquired the parameters of the corresponding CIM provider from the first CIMOM by using the information of the namespace to which the device to be configured belongs and/or the device information of the device to be configured, in this case, the first CIMOM may record the information of the namespace and/or the device information, so that the first CIMOM may actively send the parameters of the CIM provider to the second CIMOM when the corresponding CIM provider is subsequently registered with the first CIMOM.

In this embodiment, the second CIMOM acquires the parameters of the corresponding CIM provider from the first CIMOM by using the information of the namespace to which the device to be configured belongs and/or the device information of the device to be configured, and obtains the identification information of the corresponding CIM provider in the acquired parameters of the CIM provider through matching according to the device information and/or the model information of the device to be configured, so that the second CIMOM can acquire the corresponding CIM provider from the first CIMOM by using the obtained identification information of the CIM provider and register the CIM provider, and the problem of complex operation and proneness to err caused by manual registration of the CIM provider with the CIMOM in the prior art can be avoided, thereby improving the efficiency and reliability of the registration of the CIM provider.

Figure 2:
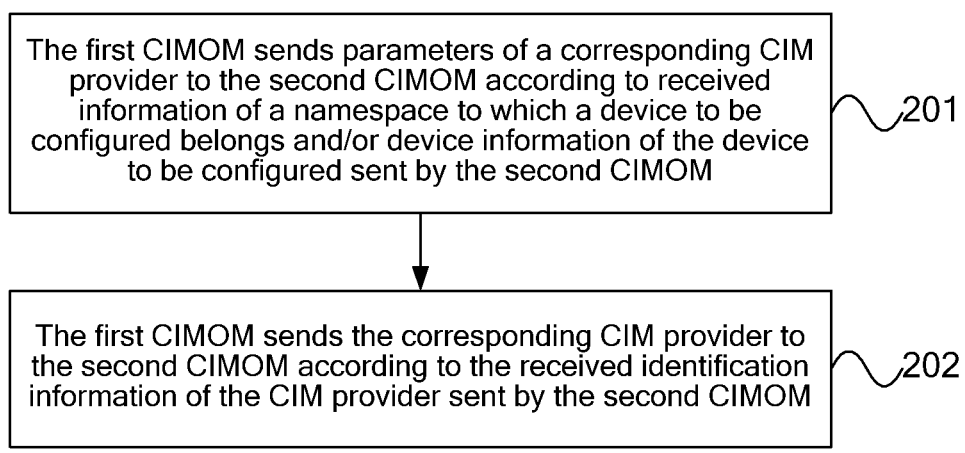
FIG. 2 is a schematic flow chart of a registration method of a CIM provider in a CIM system according to another embodiment of the present invention.

FIG. 2 is a schematic flow chart of a registration method of a CIM provider in a CIM system according to another embodiment of the present invention. A CIM system applicable to the embodiment may include a first CIMOM and a second CIMOM, where at least one CIM provider is registered on the first CIMOM. As shown in FIG. 2, the registration method of a CIM provider in a CIM system according to the embodiment may include the following.

201. The first CIMOM sends parameters of a corresponding CIM provider to the second CIMOM according to received information of a namespace to which a device to be configured belongs and/or device information of the device to be configured (that is, according to the received information of the namespace or device information, or according to the received information of the namespace and device information at the same time) sent by the second CIMOM, so that the second CIMOM obtains the identification information of the CIM provider in the parameters of the CIM provider through matching according to the device information and/or model information of the device to be configured (that is, according to the device information or the model information, or according to the device information and the model information at the same time).

The model information may be acquired through its own type definition file.

Before 201, the first CIMOM may further send information of a namespace corresponding to the second CIMOM to the second CIMOM, so that the second CIMOM obtains the information of the namespace to which the device to be configured belongs through matching.

Optionally, in 201, if the first CIMOM has not obtained the parameters of the corresponding CIM provider through matching according to the received information of the namespace to which the device to be configured belongs and/or device information of the device to be configured, in this case, the first CIMOM may record the information of the namespace and/or the device information, so that the first CIMOM may actively send the parameters of the CIM provider to the second CIMOM when the corresponding CIM provider is subsequently registered with the first CIMOM.

202. The first CIMOM sends the corresponding CIM provider to the second CIMOM according to the received identification information of the CIM provider sent by the second CIMOM, so that the second CIMOM registers the CIM provider.

In 202, the first CIMOM may specifically send the corresponding CIM provider and permission information to the second CIMOM according to the received identification information of the CIM provider sent by the second CIMOM, where the permission information is capable of indicating to the second CIMOM whether the CIM provider can be provided for other second CIMOMs, so that the forwarding permission of the CIM provider may further be effectively controlled while it is ensured that the CIM provider is correctly deployed (that is, registered).

In this embodiment, the first CIMOM sends the parameters of the corresponding CIM provider to the second CIMOM according to the received information of the namespace to which the device to be configured belongs and/or device information of the device to be configured sent by the second CIMOM, and sends the corresponding CIM provider to the second CIMOM according to the received identification information of the CIM provider sent by the second CIMOM, so that the second CIMOM registers the CIM provider, and the problem of complex operation and proneness to err caused by manual registration of the CIM provider with the CIMOM in the prior art can be avoided, thereby improving the efficiency and reliability of the registration of the CIM provider.

Figure 3:
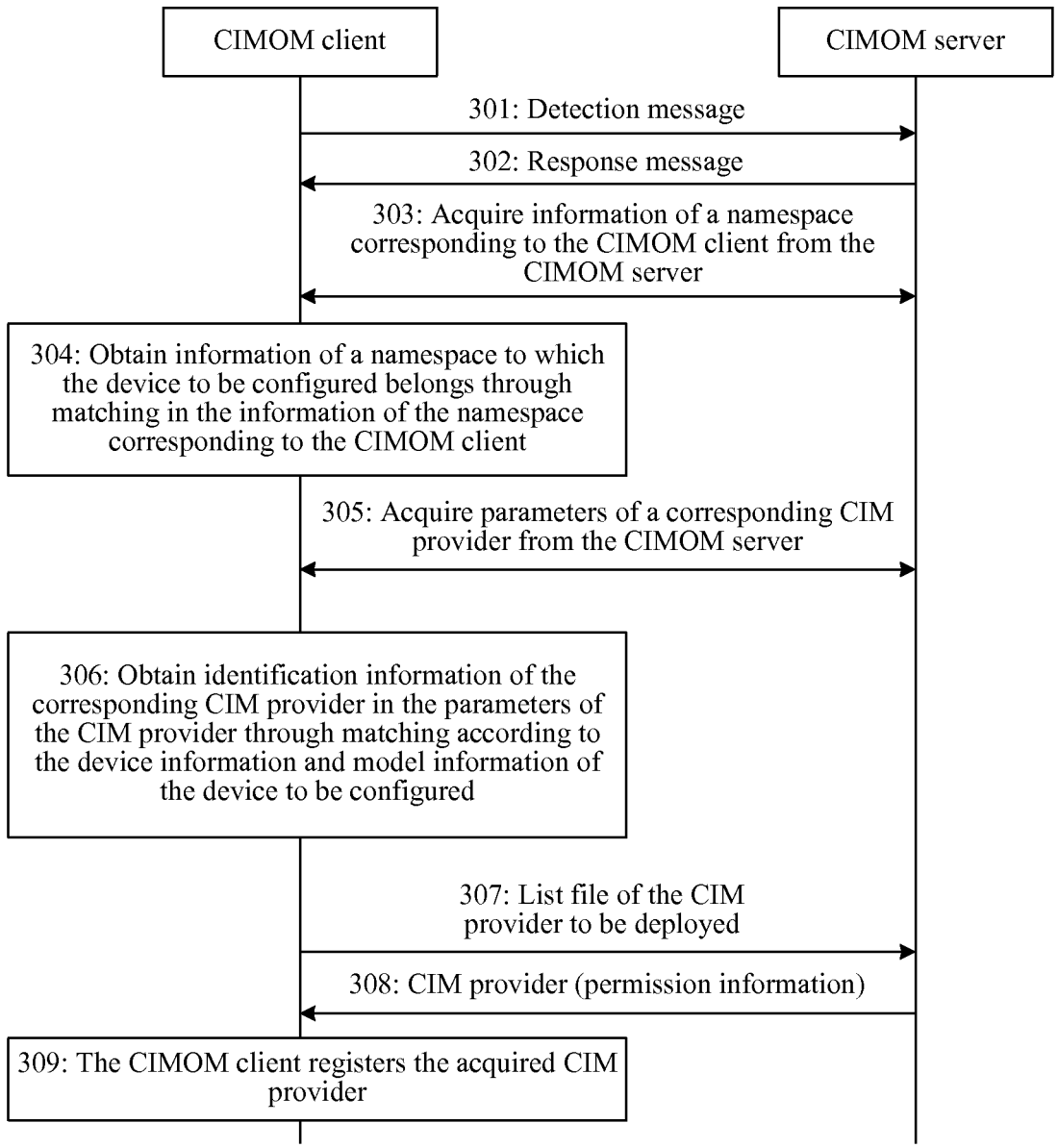
FIG. 3 is a schematic flow chart of a registration method of a CIM provider in a CIM system according to another embodiment of the present invention.

In order to make the method provided in the embodiment of the present invention clearer, an example is given below in which CIM providers corresponding to all devices on a server are registered on the CIMOM when a server is initially powered on. FIG. 3 is a schematic flow chart of a registration method of a CIM provider in a CIM system according to another embodiment of the present invention. In this embodiment, a first CIMOM may be referred to as a CIMOM server, and a second CIMOM may be referred to as a CIMOM client. As shown in FIG. 3, the registration method of a CIM provider in a CIM system according to the embodiment may include the following.

301. The CIMOM client broadcasts a detection message.

302. The CIMOM server sends a response message to the CIMOM client after judging that the validity of the CIMOM client corresponding to the detection message is passed.

303. The CIMOM client interacts with the CIMOM server, and acquires information of a namespace corresponding to the CIMOM client from the CIMOM server.

304. The CIMOM client obtains information of a namespace to which the device to be configured (that is, a device on a server that is initially powered on) belongs through matching in the acquired information of the namespace corresponding to the CIMOM client.

305. The CIMOM client interacts with the CIMOM server by using the information of the namespace to which the device to be configured belongs and/or the device information of the device to be configured, and acquires parameters of a corresponding CIM provider from the CIMOM server.

306. The CIMOM client obtains identification information of the corresponding CIM provider in the parameters of the CIM provider through matching according to the device information and model information of the device to be configured, and records the identification information in a list file of the CIM provider to be deployed.

Optionally, if the obtained CIM provider exists in a CIM repository of the CIMOM client, the CIMOM client may compare the version of the obtained CIM provider with that of the CIM provider stored in the CIM repository, if the version of the obtained CIM provider is lower, the obtained CIM provider does not need to be recorded in the list file of the CIM provider to be deployed; and if the version of the obtained CIM provider is higher, the obtained CIM provider is recorded in the list file of the CIM provider to be deployed.

307. The CIMOM client sends the list file of the CIM provider to be deployed to the CIMOM server.

308. The CIMOM server adds, according to the list file of the CIM provider to be deployed, permission information to the CIM provider, where the CIM provider is a CIM provider identified in the list file, and sends the permission information to the CIMOM client.

The foregoing permission information is capable of indicating to the CIMOM client whether the CIM provider acquired on the CIMOM client can be provided for other CIMOM clients, so that the forwarding permission of the CIM provider may further be effectively controlled while it is ensured that the CIM provider is correctly deployed (that is, registered).

309. The CIMOM client registers the acquired CIM provider.

So far, when the server is initially powered on, the registration of the CIM providers corresponding to all the devices on the server on the CIMOM is completed, so that the deployment of the CIM providers of the devices on the server becomes valid.

In this embodiment, the CIMOM client acquires the parameters of the corresponding CIM provider from the CIMOM server by using the information of the namespace to which the device to be configured (that is, the device on the server that is initially powered on) belongs and the device information of the device to be configured, and obtains the identification information of the corresponding CIM provider in the parameters of the CIM provider through matching according to the device information and the model information of the device to be configured, so that the CIMOM client can acquire the corresponding CIM provider from the CIMOM server by using the obtained identification information of the CIM provider, and register the CIM provider, and the problem of complex operation and proneness to err caused by manual registration of the CIM provider with the CIMOM in the prior art can be avoided, thereby improving the efficiency and reliability of the registration of the CIM provider.

Figure 4:
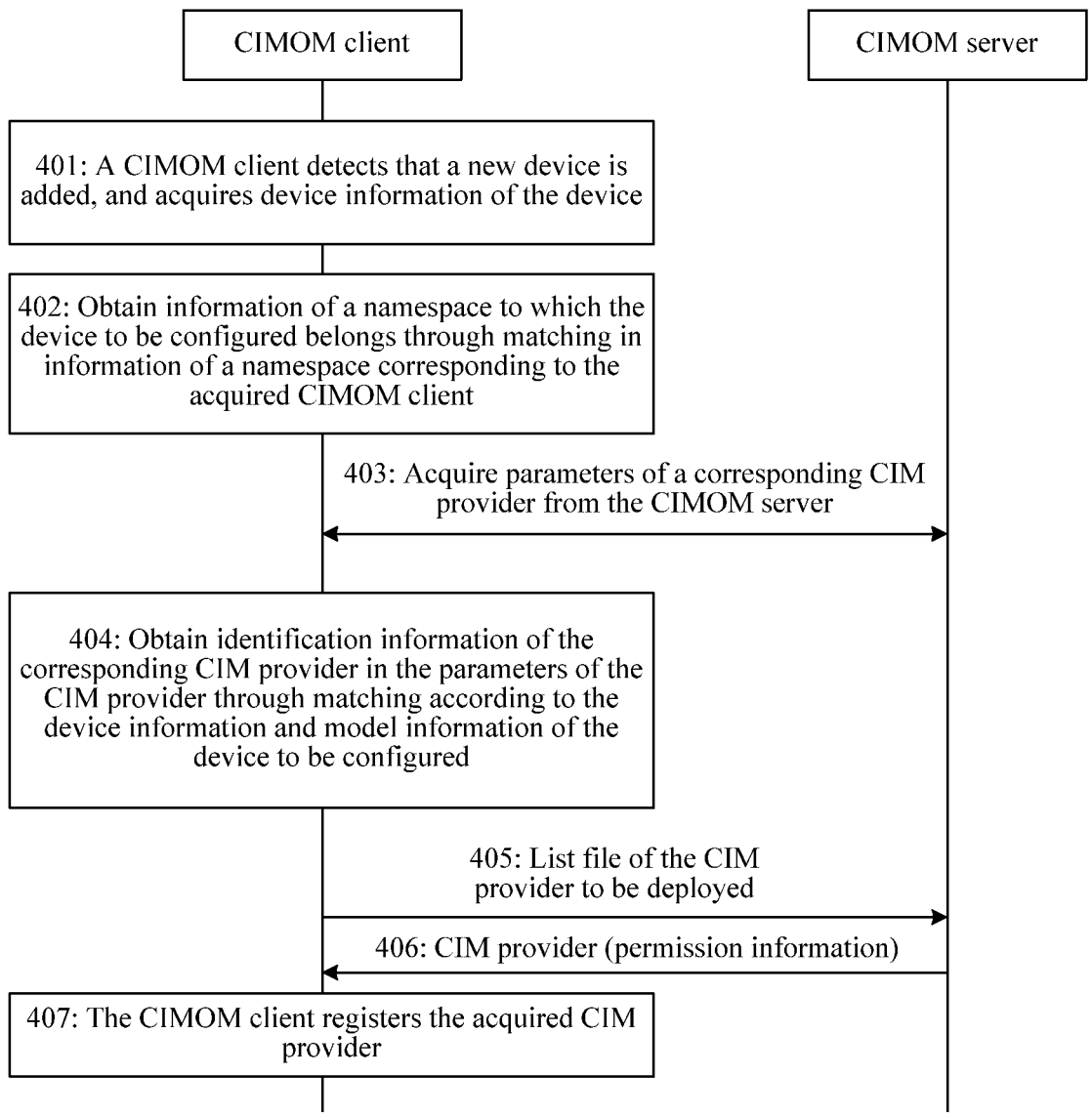
FIG. 4 is a schematic flow chart of a registration method of a CIM provider in a CIM system according to another embodiment of the present invention.

In order to make the method provided in the embodiment of the present invention clearer, an example is given below in which a CIM provider corresponding to a new device is registered on a CIMOM when the device is added on a server. FIG. 4 is a schematic flow chart of a registration method of a CIM provider in a CIM system according to another embodiment of the present invention. On the basis of the embodiment corresponding to FIG. 3, as shown in FIG. 4, the registration method of a CIM provider in a CIM system according to the embodiment may further include the following.

401. A CIMOM client detects that a new device is added, and acquires device information of the device.

402. The CIMOM client obtains information of a namespace to which the device to be configured (that is, the newly added device) belongs through matching in the acquired information of a namespace corresponding to the CIMOM client.

403. The CIMOM client interacts with a CIMOM server by using the information of the namespace to which the device to be configured belongs and the device information of the device to be configured, and acquires parameters of a corresponding CIM provider from the CIMOM server.

404. The CIMOM client obtains identification information of the corresponding CIM provider in the parameters of the CIM provider through matching according to the device information and model information of the device to be configured, and records the identification information in a list file of the CIM provider to be deployed.

Optionally, if the obtained CIM provider exists in a CIM repository of the CIMOM client, the CIMOM client may compare the version of the obtained CIM provider with that of the CIM provider stored in the CIM repository, if the version of the obtained CIM provider is lower, the obtained CIM provider does not need to be recorded in the list file of the CIM provider to be deployed; and if the version of the obtained CIM provider is higher, the obtained CIM provider is recorded in the list file of the CIM provider to be deployed.

405. The CIMOM client sends the list file of the CIM provider to be deployed to the CIMOM server.

406. The CIMOM server adds, according to the list file of the CIM provider to be deployed, permission information to the CIM provider, where the CIM provider is a CIM provider identified in the list file, and sends the permission information to the CIMOM client.

The foregoing permission information is capable of indicating to the CIMOM client whether the acquired CIM provider can be provided for other CIMOM clients, so that the forwarding permission of the CIM provider may further be effectively controlled while it is ensured that the CIM provider is correctly deployed (that is, registered).

407. The CIMOM client registers the acquired CIM provider.

So far, when the server is initially powered on, the registration of the CIM providers corresponding to all the devices on the server on the CIMOM is completed, so that the deployment of the CIM providers of the devices on the server becomes valid.

In this embodiment, the CIMOM client acquires the parameters of the corresponding CIM provider from the CIMOM server by using the information of the namespace to which the device to be configured (that is, the newly added device) belongs and the device information of the device to be configured, and obtains the identification information of the corresponding CIM provider in the parameters of the CIM provider through matching according to the device information and the model information of the device to be configured, so that the CIMOM client can acquire the corresponding CIM provider from the CIMOM server by using the obtained identification information of the CIM provider, and register the CIM provider, and the problem of complex operation and proneness to err caused by manual registration of the CIM provider with the CIMOM in the prior art can be avoided, thereby improving the efficiency and reliability of the registration of the CIM provider.

It should be noted that, the foregoing method embodiments are expressed as a series of action combinations for ease of description; however, persons skilled in the art should know that the present invention is not limited to the sequence of the actions described, because some steps may be performed in other sequences or concurrently according to the present invention. Next, persons skilled in the art should also know that, the embodiments described in the specification are exemplary embodiments, and involved actions and modules are not indispensable for the present invention.

In the foregoing embodiments, descriptions of the embodiments have different emphases, and for parts that are not described in detail in one embodiment, reference may be made to the relevant description of the other embodiments.

Figure 5:
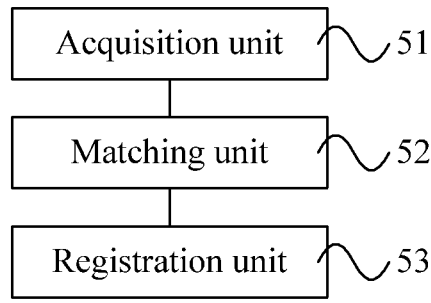
FIG. 5 is a schematic structural diagram of a CIMOM according to another embodiment of the present invention.

FIG. 5 is a schematic structural diagram of a CIMOM according to another embodiment of the present invention. As shown in FIG. 5, the CIMOM of this embodiment may include an acquisition unit 51, a matching unit 52, and a registration unit 53. The acquisition unit 51 is configured to acquire parameters of a corresponding CIM provider from another CIMOM by using information of a namespace to which a device to be configured belongs and/or device information of the device to be configured, where the acquired parameters of the CIM provider is sent by the another CIMOM according to the information of the namespace and/or the device information, and at least one CIM provider is registered on the another CIMOM; the matching unit 52 is configured to obtain, through matching, identification information of the corresponding CIM provider in the parameters of the CIM provider that are acquired by the acquisition unit according to the device information and/or model information of the device to be configured; and the registration unit 53 is configured to acquire the corresponding CIM provider from the another CIMOM by using the identification information of the CIM provider obtained by the matching unit through matching, and register the CIM provider.

The functions of the second CIMOM in the embodiment corresponding to FIG. 1 and the CIMOM clients in the embodiments corresponding to FIG. 3 and FIG. 4 may all be implemented by the CIMOM provided in the embodiment.

Figure 6:
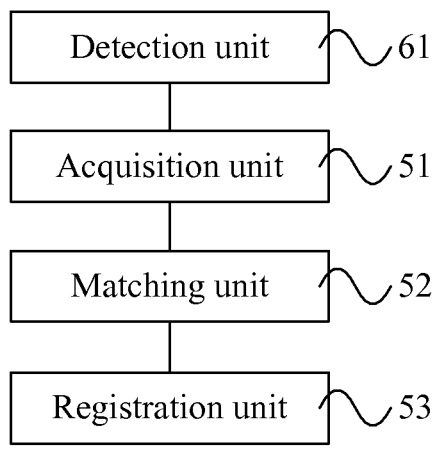
FIG. 6 is a schematic structural diagram of a CIMOM according to another embodiment of the present invention.

Optionally, as shown in FIG. 6, this embodiment may further include a detection unit 61 configured to detect another CIMOM that is capable of providing services through broadcast.

Optionally, the acquisition unit 51 in this embodiment may further acquire information of a corresponding namespace from another CIMOM, and obtain the information of the namespace to which the device to be configured belongs through matching.

In this embodiment, if the obtained CIM provider is stored in a CIM repository of the CIMOM, the matching unit 51 may specifically obtain, through matching, identification information of a corresponding CIM provider of a higher version than that of the CIM provider stored in the CIM repository in the parameters of the CIM provider that are acquired by the acquisition unit according to the device information and/or model information of the device to be configured.

Specifically, the registration unit 53 in this embodiment may specifically acquire the corresponding CIM provider and permission information from the another CIMOM by using the identification information of the CIM provider obtained by the matching unit 51 through matching, where the foregoing permission information is used to indicate whether the acquired CIM provider can be provided for other CIMOMs.

In this embodiment, the CIMOM acquires the parameters of the corresponding CIM provider from another CIMOM through the acquisition unit by using the information of the namespace to which the device to be configured belongs and/or the device information of the device to be configured, and the matching unit obtains, through matching, the identification information of the corresponding CIM provider in the parameters of the CIM provider that are acquired by the acquisition unit according to the device information and/or the model information of the device to be configured, so that the registration unit can acquire the corresponding CIM provider from the another CIMOM by using the identification information of the CIM provider obtained by the matching unit through matching and register the CIM provider, and the problem of complex operation and proneness to err caused by manual registration of the CIM provider with the CIMOM in the prior art can be avoided, thereby improving the efficiency and reliability of the registration of the CIM provider.

Figure 7:
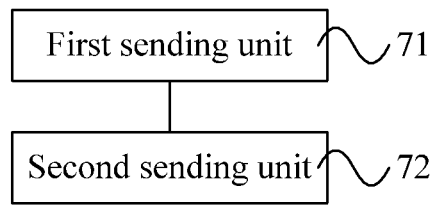
FIG. 7 is a schematic structural diagram of a CIMOM according to another embodiment of the present invention.

FIG. 7 is a schematic structural diagram of a CIMOM according to another embodiment of the present invention. As shown in FIG. 7, the CIMOM of this embodiment may include a first sending unit 71 and a second sending unit 72. The first sending unit 71 is configured to send parameters of a corresponding CIM provider to another CIMOM according to received information of a namespace to which a device to be configured belongs and/or device information of the device to be configured sent by the another CIMOM, so that the another CIMOM obtains identification information of the corresponding CIM provider in the parameters of the CIM provider through matching according to the device information and/or model information of the device to be configured; and the second sending unit 72 is configured to send the corresponding CIM provider to the another CIMOM according to the received identification information of the CIM provider sent by the another CIMOM, so that the another CIMOM registers the CIM provider.

The functions of the first CIMOM in the embodiment corresponding to FIG. 2 and the CIMOM servers in the embodiments corresponding to FIG. 3 and FIG. 4 can all be implemented by the CIMOM provided in this embodiment.

Optionally, the first sending unit 71 in this embodiment may further send information of a namespace corresponding to the another CIMOM to the another CIMOM, so that the another CIMOM obtains the information of the namespace to which the device to be configured belongs through matching.

Specifically, the second sending unit 72 in this embodiment may specifically send the corresponding CIM provider and permission information to the another CIMOM according to the received identification information of the CIM provider sent by the another CIMOM, where the permission information is used to indicate to the another CIMOM whether the CIM provider can be provided for other CIMOMs.

In this embodiment, the CIMOM sends the parameters of the corresponding CIM provider to the another CIMOM through the first sending unit according to the received information of the namespace to which the device to be configured belongs and/or device information of the device to be configured sent by the another CIMOM, and sends the corresponding CIM provider to the another CIMOM through the second sending unit according to the received identification information of the CIM provider sent by the another CIMOM, so that the another CIMOM registers the CIM provider, and the problem of complex operation and proneness to err caused by manual registration of the CIM provider with the CIMOM in the prior art can be avoided, thereby improving the efficiency and reliability of the registration of the CIM provider.

It may be clearly understood by persons skilled in the art that, for the purpose of convenient and brief description, for a detailed working process of the foregoing system, apparatus and unit, reference may be made to the corresponding process in the method embodiments, and the details will not be described here again.

In several embodiments provided in the present application, it should be understood that, the disclosed system, apparatus, and method may be implemented in other ways. For example, the described apparatus embodiments are merely exemplary. For example, the unit division is merely logical function division, and may be other division in actual implementation. For example, multiple units or components may be combined or integrated into another system, or some features may be ignored or not performed. Furthermore, the shown or discussed coupling or direct coupling or communication connection may be accomplished through some interfaces, and indirect coupling or communication connection between apparatuses or units may be electrical, mechanical, or in other forms.

Units described as separate members may be or may not be physically separated. Members shown as units may be or may not be physical units, that is, may be located in one place, or distributed to multiple network units. Some or all of the units may be selected to achieve the objective of the solution of the embodiments according to actual demands.

In addition, various functional units according to each embodiment of the present invention may be integrated in one processing unit, or may exist as various separate physical units, or two or more units may also be integrated in one unit. The integrated unit may be implemented through hardware, or may also be implemented in a form of hardware plus a software functional module.

The integrated unit implemented in the form of software functional unit may be stored in a computer readable storage medium. The software functional unit is stored in a storage medium, and includes several instructions used to instruct computer equipment (for example, a personal computer, a server, or a network equipment) to perform the steps of the methods according to the embodiments of the present invention. The storage medium includes various media capable of storing program codes, such as, a U disk, a mobile hard disk, a read-only memory (ROM), a random access memory (RAM), a magnetic disk or an optical disk.

Finally, it should be noted that, the above embodiments are merely provided for describing the technical solutions of the present invention, but not intended to limit the present invention. It should be understood by persons of ordinary skill in the art that, although the present invention has been described in detail with reference to the embodiments, modifications can be made to the technical solutions described in the embodiments, or equivalent replacements can be made to some technical features in the technical solutions, and such modifications or replacements do not cause the essence of corresponding technical solutions to depart from the spirit and scope of the present invention.

What is claimed is:

1. A registration method of a common information model (CIM) provider in a CIM system, wherein the CIM system comprises a first CIM object manager (CIMOM) and a second CIMOM, wherein and at least one CIM provider is registered on the first CIMOM the method comprising:
   acquiring, by the second CIMOM, parameters of a CIM provider from the first CIMOM by using information of a namespace to which a device to be configured belongs or device information of the device to be configured, wherein the acquired parameters of the CIM provider are sent by the first CIMOM according to the information of the namespace or the device information;
   obtaining, by the second CIMOM, identification information of the CIM provider in the parameters of the CIM provider according to the device information or model information of the device to be configured, wherein the device information or model information corresponding to the identification information of the CIM provider matches the device information or model information of the device to be configured;
   acquiring, by the second CIMOM, the CIM provider from the first CIMOM by using the obtained identification information of the CIM provider; and
   registering the CIM provider.

2. The method according to claim 1, wherein before the second CIMOM acquires the parameters of the CIM provider from the first CIMOM by using the information of the namespace, the method further comprises:
   detecting, by second CIMOM, that the first CIMOM is capable of providing services through broadcast.

3. The method according to claim 1, wherein before the second CIMOM acquires the parameters of the CIM provider from the first CIMOM by using the information of the namespace to which the device to be configured belongs, the method further comprises:
   acquiring, by the second CIMOM, information of a corresponding namespace from the first CIMOM; and
   obtaining, by the second CIMOM, the information of the namespace to which the device to be configured belongs through matching.

4. The method according to claim 1, wherein if the obtained CIM provider is stored in a CIM repository of the second CIMOM, obtaining the identification information comprises:
   obtaining, by the second CIMOM, identification information of a CIM provider of a higher version than that of the CIM provider stored in the CIM repository in the parameters of the CIM provider according to the device information or the model information of the device to be configured, wherein the device information or model information corresponding to the identification information of the CIM provider of a higher version than that of the CIM provider stored in the CIM repository matches the device information or model information of the device to be configured.

5. The method according to claim 4, wherein acquiring the CIM provider from the first CIMOM by using the obtained identification information of the CIM provider comprises:
   acquiring, by the second CIMOM, the corresponding CIM provider and permission information from the first CIMOM by using the obtained identification information of the CIM provider, wherein the permission information is used to indicate whether the acquired CIM provider is capable of being provided for other second CIMOMs.

6. The method according to claim 1, wherein acquiring the CIM provider from the first CIMOM by using the obtained identification information of the CIM provider comprises:
   acquiring, by the second CIMOM, the corresponding CIM provider and permission information from the first CIMOM by using the obtained identification information of the CIM provider, wherein the permission information is used to indicate whether the acquired CIM provider is capable of being provided for other second CIMOMs.

7. A registration method of a common information model (CIM) provider in a CIM system, wherein the CIM system comprises a first CIM object manager (CIMOM) and a second CIMOM, and wherein at least one CIM provider is registered on the first CIMOM, the method comprising:
   sending, by the first CIMOM, parameters of a CIM provider to the second CIMOM according to received information of a namespace to which a device to be configured belongs or device information of the device to be configured sent by the second CIMOM, so that the second CIMOM obtains identification information of the CIM provider in the parameters of the CIM provider according to the device information or model information of the device to be configured, wherein the device information or model information corresponding to the identification information of the CIM provider matches the device information or model information of the device to be configured; and
   sending, by the first CIMOM, the CIM provider to the second CIMOM according to the identification information of the CIM provider sent by the second CIMOM, so that the second CIMOM registers the CIM provider.

8. The method according to claim 7, wherein before the first CIMOM sends the parameters, the method further comprises:
   sending, by the first CIMOM, information of a namespace of the second CIMOM to the second CIMOM, so that the second CIMOM obtains the information of the namespace to which the device to be configured belongs through matching.

9. The method according to claim 7, wherein sending the CIM provider to the second CIMOM comprises:
   sending, by the first CIMOM, the CIM provider and permission information to the second CIMOM according to the identification information of the CIM provider sent by the second CIMOM, wherein the permission information is used to indicate to the second CIMOM whether the CIM provider is capable of being provided for other second CIMOMs.

10. A common information model object manager (CIMOM), comprising:
    an acquisition unit, configured to acquire parameters of a common information model (CIM) provider from another CIMOM by using information of a namespace to which a device to be configured belongs or device information of the device to be configured, wherein the acquired parameters of the CIM provider are sent by the another CIMOM according to the information of the namespace or the device information, and wherein at least one CIM provider is registered on the another CIMOM;
    a matching unit, configured to obtain identification information of the CIM provider in the parameters of the CIM provider that are acquired by the acquisition unit according to the device information or model information of the device to be configure, wherein the device information or model information corresponding to the identification information of the CIM provider matches the device information or model information of the device to be configured; and a registration unit, configured to acquire the CIM provider from the another CIMOM by using the identification information of the CIM provider obtained by the matching unit through matching, and register the CIM provider.

11. The CIMOM according to claim 10, wherein the CIMOM further comprises a detection unit, configured to detect the another CIMOM that is capable of providing services through broadcast.

12. The CIMOM according to claim 10, wherein the acquisition unit is further configured to acquire information of a namespace from the another CIMOM, and obtain the information of the namespace to which the device to be configured belongs through matching.

13. The CIMOM according to claim 10, wherein if the obtained CIM provider is stored in a CIM repository of the CIMOM, the matching unit is specifically configured to obtain identification information of a CIM provider of a higher version than that of the CIM provider stored in the CIM repository in the parameters of the CIM provider acquired by the acquisition unit according to the device information or model information of the device to be configured, wherein the device information or model information corresponding to the identification information of the CIM provider of a higher version than that of the CIM provider stored in the CIM repository matches the device information or model information of the device to be configured.

14. The CIMOM according to claim 13, wherein the registration unit is specifically configured to acquire the CIM provider and permission information from the another CIMOM by using the identification information of the CIM provider obtained by the matching unit through matching, wherein the permission information is used to indicate whether the acquired CIM provider is capable of being provided for other CIMOMs.

15. The CIMOM according to claim 10, wherein the registration unit is specifically configured to acquire the CIM provider and permission information from the another CIMOM by using the identification information of the CIM provider obtained by the matching unit through matching, wherein the permission information is used to indicate whether the acquired CIM provider is capable of being provided for other CIMOMs.

16. A common information model object manager (CIMOM), comprising:

a first sending unit, configured to send parameters of a common information model (CIM) provider to another CIMOM according to received information of a namespace to which a device to be configured belongs or device information of the device to be configured sent by the another CIMOM, so that the another CIMOM obtains identification information of the CIM provider in the parameters of the CIM provider according to the device information or model information of the device to be configured, wherein the device information or model information corresponding to the identification information of the CIM provider matches the device information or model information of the device to be configured; and a second sending unit, configured to send the CIM provider to the another CIMOM according to the identification information of the CIM provider sent by the another CIMOM, so that the another CIMOM registers the CIM provider.

17. The CIMOM according to claim 16, wherein the first sending unit is further configured to send information of a namespace of the another CIMOM to the another CIMOM, so that the another CIMOM obtains the information of the namespace to which the device to be configured belongs through matching.

18. The CIMOM according to claim 17, wherein the second sending unit is configured to send the CIM provider and permission information to the another CIMOM according to the identification information of the CIM provider sent by the another CIMOM, wherein the permission information is used to indicate to the another CIMOM whether the CIM provider is capable of being provided for other CIMOMs.

19. The CIMOM according to claim 16, wherein the second sending unit is configured to send the CIM provider and permission information to the another CIMOM according to the identification information of the CIM provider sent by the another CIMOM, wherein the permission information is used to indicate to the another CIMOM whether the CIM provider is capable of being provided for other CIMOMs.

20. A non-transitory computer-readable medium having computer executable instructions for performing a registration method of a common information model (CIM) provider in a CIM system which includes a first CIM object manager (CIMOM) and a second CIMOM, and wherein at least one CIM provider is registered on the first CIMOM, the registration method comprising:

acquiring, by the second CIMOM, parameters of a CIM provider from the first CIMOM by using information of a namespace to which a device to be configured belongs or device information of the device to be configured, wherein the acquired parameters of the CIM provider are sent by the first CIMOM according to the information of the namespace or the device information;

obtaining, by the second CIMOM, identification information of the CIM provider in the parameters of the CIM provider according to the device information or model information of the device to be configured, wherein the device information or model information corresponding to the identification information of the CIM provider matches the device information or model information of the device to be configured;

acquiring, by the second CIMOM, the CIM provider from the first CIMOM by using the obtained identification information of the CIM provider; and registering the CIM provider.

* * * * *